(12) United States Patent
Mosley et al.

(10) Patent No.: US 12,265,002 B2
(45) Date of Patent: *Apr. 1, 2025

(54) CURB STOP ASSEMBLY

(71) Applicant: Mueller International, LLC, Atlanta, GA (US)

(72) Inventors: Harold Thomas Mosley, Ooltewah, TN (US); Clay Evan Bowman, Ooltewah, TN (US); Timothy Bain Ervin, Apison, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,507

(22) Filed: Jun. 8, 2023

(65) Prior Publication Data

US 2023/0314286 A1 Oct. 5, 2023

Related U.S. Application Data

(63) Continuation of application No. 16/773,357, filed on Jan. 27, 2020, now Pat. No. 11,709,115.

(51) Int. Cl.
*G01N 1/20* (2006.01)

(52) U.S. Cl.
CPC ..... *G01N 1/2035* (2013.01); *G01N 2001/205* (2013.01)

(58) Field of Classification Search
CPC .. A61K 31/4427; A61K 31/495; A61K 31/53; A61P 3/04; A61P 3/06; A61P 3/10; G01N 1/2035; G01N 2001/205; E03B 7/08; E03B 7/09; E03B 9/00; E03B 9/02; E03B 2009/022; E03B 9/04; E03B 9/06; E03B 9/08; E03B 9/10; E03B 9/12; E03B 9/20;
(Continued)

(56) References Cited

U.S. PATENT DOCUMENTS

| 3,847,817 A | 11/1974 | Jarman |
| 4,204,613 A | 5/1980 | Terzian et al. |

(Continued)

FOREIGN PATENT DOCUMENTS

| CN | 206458889 | 9/2017 |
| JP | 4483160 | 6/2010 |

OTHER PUBLICATIONS

Mosley, Harold Thomas; Non-Final Office Action for U.S. Appl. No. 16/773,357, filed Jan. 27, 2020, mailed Dec. 22, 2022, 18 pgs.
(Continued)

*Primary Examiner* — John Fitzgerald
*Assistant Examiner* — Truong D Phan
(74) *Attorney, Agent, or Firm* — Taylor English Duma LLP

(57) ABSTRACT

A curb stop assembly includes a curb stop valve defining a valve inlet, a valve outlet, and a fluid passageway therebetween; a curb stop sleeve coupled to and extending outward from curb stop valve; and a curb stop rod received in the curb stop sleeve and configured to actuate the curb stop valve between a closed valve configuration and an open valve configuration; wherein, in the closed valve configuration, fluid is prevented from flowing through the fluid passageway, and in the open valve configuration, wherein fluid is permitted to flow through the fluid passageway.

13 Claims, 5 Drawing Sheets

(58) Field of Classification Search
CPC ... E03B 11/12; E03B 9/14; E03B 3/34; E03B 3/10; E03B 3/12; E03B 3/16; E03B 1/00; E03B 1/044; E03B 2001/045; E03B 3/00; E03B 7/072; E03B 7/04; E03B 7/02; E03B 7/095
USPC ...... 73/61.56, 265, 250; 137/247.21, 315.18, 137/449, 519.5, 533.11, 539, 15.25, 137/315.22, 4, 84, 601.17, 15.22, 230, 137/232, 243.1, 505.27, 505.29, 533.21, 137/516.21, 516.23, 601.19, 516.19
See application file for complete search history.

(56) References Cited

U.S. PATENT DOCUMENTS

| | | | |
|---|---|---|---|
| 4,288,210 A | | 9/1981 | Leonard |
| 4,479,570 A | * | 10/1984 | Kamio ............... F16D 48/04 285/190 |
| 5,634,522 A | | 6/1997 | Hershberger |
| 6,131,604 A | * | 10/2000 | Harriss ............ F16L 55/1018 137/382.5 |
| 11,709,115 B2 | * | 7/2023 | Mosley ............... G01N 1/2035 73/863.86 |
| 2001/0035514 A1 | * | 11/2001 | Laskaris ............... F16K 5/227 251/315.11 |
| 2006/0254649 A1 | * | 11/2006 | Cotugno .................. E03B 9/08 137/365 |
| 2008/0023077 A1 | * | 1/2008 | Weisz .................. F16K 31/46 137/365 |
| 2009/0025795 A1 | * | 1/2009 | Wears ..................... F16K 1/48 137/15.24 |
| 2012/0250461 A1 | | 10/2012 | Millot et al. |
| 2018/0023711 A1 | * | 1/2018 | Hawa .................. F16K 5/0636 137/15.22 |
| 2018/0171605 A1 | * | 6/2018 | Mosley ..................... E03B 7/08 |
| 2018/0258622 A1 | | 9/2018 | Rachapudi et al. |
| 2018/0347157 A1 | | 12/2018 | Brotherton et al. |
| 2021/0231536 A1 | | 7/2021 | Mosley et al. |
| 2023/0314287 A1 | | 10/2023 | Mosley et al. |

OTHER PUBLICATIONS

Mosley, Harold Thomas; Notice of Allowance for U.S. Appl. No. 16/773,357, filed Jan. 27, 2020, mailed Mar. 9, 2023, 8 pgs.

Mosley, Harold Thomas; Requirement for Restriction/Election for U.S. Appl. No. 16/773,357, filed Jan. 27, 2020, mailed Sep. 28, 2022, 6 pgs.

Mosley, Harold Thomas; Non-Final Office Action for U.S. Appl. No. 18/207,521, filed Jun. 8, 2023, mailed Jan. 4, 2024, 25 pgs.

Mosley, Harold Thomas; Final Office Action for U.S. Appl. No. 18/207,521, filed Jun. 8, 2023, mailed Apr. 1, 2024, 20 pgs.

Mosley, Harold Thomas; Non-Final Office Action for U.S. Appl. No. 18/207,521, filed Jun. 8, 2023, mailed Jul. 5, 2024, 20 pgs.

Mosley, Harold Thomas; Notice of Allowance for U.S. Appl. No. 18/207,521, filed Jun. 8, 2023, mailed Dec. 3, 2024, 12 pgs.

* cited by examiner

CURB STOP ASSEMBLY

CROSS-REFERENCE TO RELATED APPLICATIONS

The present application is a continuation of U.S. application Ser. No. 16/773,357, filed Jan. 27, 2020, which is hereby specifically incorporated by reference herein in its entirety.

TECHNICAL FIELD

This disclosure relates to fluid piping systems. More specifically, this disclosure relates to a pit assembly for housing a curb stop assembly and a pressure transducer.

BACKGROUND

Fluid sampling stations can provide an access point for collecting fluid samples from a fluid piping system. Curb stop valves are typically provided for selectively permitting or preventing fluid flow from the fluid piping system to the sampling station. The curb stop valves can be installed above- or below-grade and are often subjected to undesirable factors, such as dirt, moisture, impacts, tampering, and the like.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a pit assembly comprising a pit housing; a curb stop assembly comprising a curb stop valve, the curb stop valve mounted within the pit housing; and a pressure transducer mounted within the pit housing A fluid testing system is disclosed, the fluid testing system comprising a pit housing configured to be installed below-grade, the pit housing defining an interior pit cavity; a sampling station housing mounted on the pit housing and configured to be installed above-grade, the sampling station housing defining an interior sampling station cavity; a pressure transducer mounted within the interior pit cavity; a sampling assembly mounted within the interior sampling station cavity; and a curb stop assembly at least partially mounted within the interior pit cavity.

Also disclosed is a method for using a fluid testing system, the method comprising providing a pit housing, the pit housing defining an interior pit cavity, a curb stop valve mounted within the interior pit cavity; opening the curb stop valve to permit fluid to flow through the curb stop valve into a sampling pipe, the sampling pipe at least partially mounted within the interior pit cavity; and dispensing the fluid from the sampling pipe through a sampling assembly, the sampling assembly mounted within a sampling station housing.

A curb stop assembly is disclosed, the curb stop assembly comprising a curb stop valve defining a valve inlet, a valve outlet, and a fluid passageway therebetween; a curb stop sleeve coupled to and extending outward from curb stop valve; and a curb stop rod received in the curb stop sleeve and configured to actuate the curb stop valve between a closed valve configuration and an open valve configuration; wherein, in the closed valve configuration, fluid is prevented from flowing through the fluid passageway, and in the open valve configuration, wherein fluid is permitted to flow through the fluid passageway.

Additionally, disclosed is a pit assembly comprising a pit housing defining a pit lid opening; a curb stop assembly mounted within the pit housing and comprising: a curb stop valve defining a valve inlet, a valve outlet, and a fluid passageway therebetween; a curb stop sleeve coupled to and extending outward from curb stop valve; and a curb stop rod received in the curb stop sleeve and configured to actuate the curb stop valve between a closed valve configuration and an open valve configuration; wherein, in the closed valve configuration, fluid is prevented from flowing through the fluid passageway, and in the open valve configuration, wherein fluid is permitted to flow through the fluid passageway; and wherein the curb stop rod and the curb stop sleeve extend through a pit lid opening in the pit housing.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
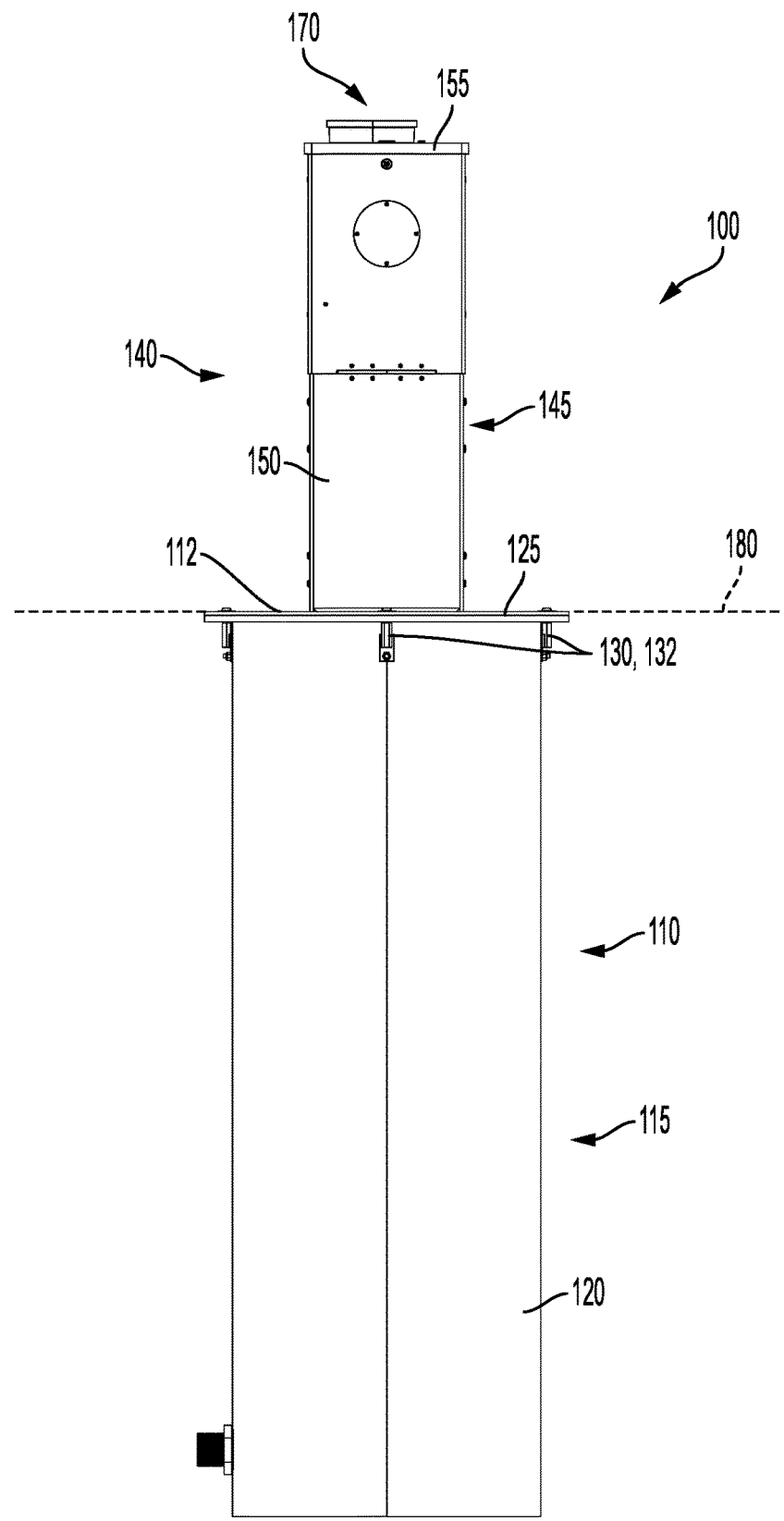
FIG. 1 is a front view of a fluid testing system comprising a pit assembly and a sampling station assembly, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a pit assembly and associated methods, systems, devices, and various apparatus. Example aspects of the pit assembly can comprise a pit housing defining an interior pit cavity. A curb stop assembly and a pressure transducer can be mounted within and protected by the pit housing. It would be understood by one of skill in the art that the disclosed pit assembly is described in but a few exemplary aspects among many. No particular terminology or description should be considered limiting on the disclosure or the scope of any claims issuing therefrom.

FIG. 1 illustrates a first aspect of a fluid testing system 100 according to the present disclosure. According to example aspects, the fluid testing system 100 can be configured to test one or more characteristics of fluid from a fluid piping system (not shown). In a first example aspect, the fluid testing system 100 may be configured to test the quality of the fluid; for example, the fluid testing system 100 may measure levels of lead, bacteria, nitrates, chlorine, pH levels, or the like. The fluid piping system can be any fluid-carrying system, such as, for example, a potable water system. In other aspects, the fluid piping system can be another type of water supply system, a natural gas system, a sewage system, an irrigation network, or the like. In some aspects, the fluid testing system 100 can also or alternatively be configured to measure the pressure of the fluid in the fluid piping system. Furthermore, in various aspects, the fluid testing system 100 may be able to wirelessly relay information related to the fluid pressure, or other measured characteristics, to a third party or an external device (e.g., an operations center, a computer, a phone, etc.), as described in further detail below. In other aspects, the fluid testing system 100 may be configured to measure other characteristics of the fluid.

According to example aspects, the fluid testing system 100 can comprise a pit assembly 110 and a sampling station assembly 140. As shown, example aspects of the pit assembly 110 can comprise a pit housing 115. The pit housing 115 can comprise a pit liner 120 and a pit lid 125. Other aspects of the pit housing 115 may not comprise the pit lid 125 and may comprise the pit liner 120 only. As shown, the pit lid 125 can be secured to the pit housing 115 by one or more fasteners 130. For example, the fasteners 130 can be screw and bracket assemblies 132 or any other suitable fasteners known in the art, including, but not limited to, nut and bolt assemblies, welding, adhesives, and the like. The pit housing 115 can be configured to house and protect various components therein. For example, the pit housing 115 can be configured to house and protect a curb stop assembly 200 (shown in FIG. 2) for selectively shutting of fluid flow to the sampling station assembly 140. Example aspects of the pit housing 115 can also be configured to house a pressure transducer 290 (shown in FIG. 2) for measuring the pressure of the fluid in the fluid piping system, as shown and further described below.

The pit liner 120 and the pit lid 125 can be formed from a substantially rigid material, such that the components mounted therein can be sufficiently protected. For example, the pit liner 120 and pit lid 125 can be formed from a metal material, such as steel. In other aspects, the pit liner 120 and pit lid 125 can be formed from any other suitably rigid material, including, but not limited to, plastics and other types of metal, or any suitable combination thereof. In example aspects, the pit liner 120 and the pit lid 125 can be formed from the same material, while in other aspects, the pit liner 120 and the pit lid 125 can be formed from varying materials. In example aspects, the pit housing 115 can be installed below-grade (i.e., below ground level 180), and the pit lid 125 can be about flush with the ground level 180. Other aspects of the pit assembly 110 can be installed fully or partially above-grade (i.e., above ground level 180).

Figure 2:
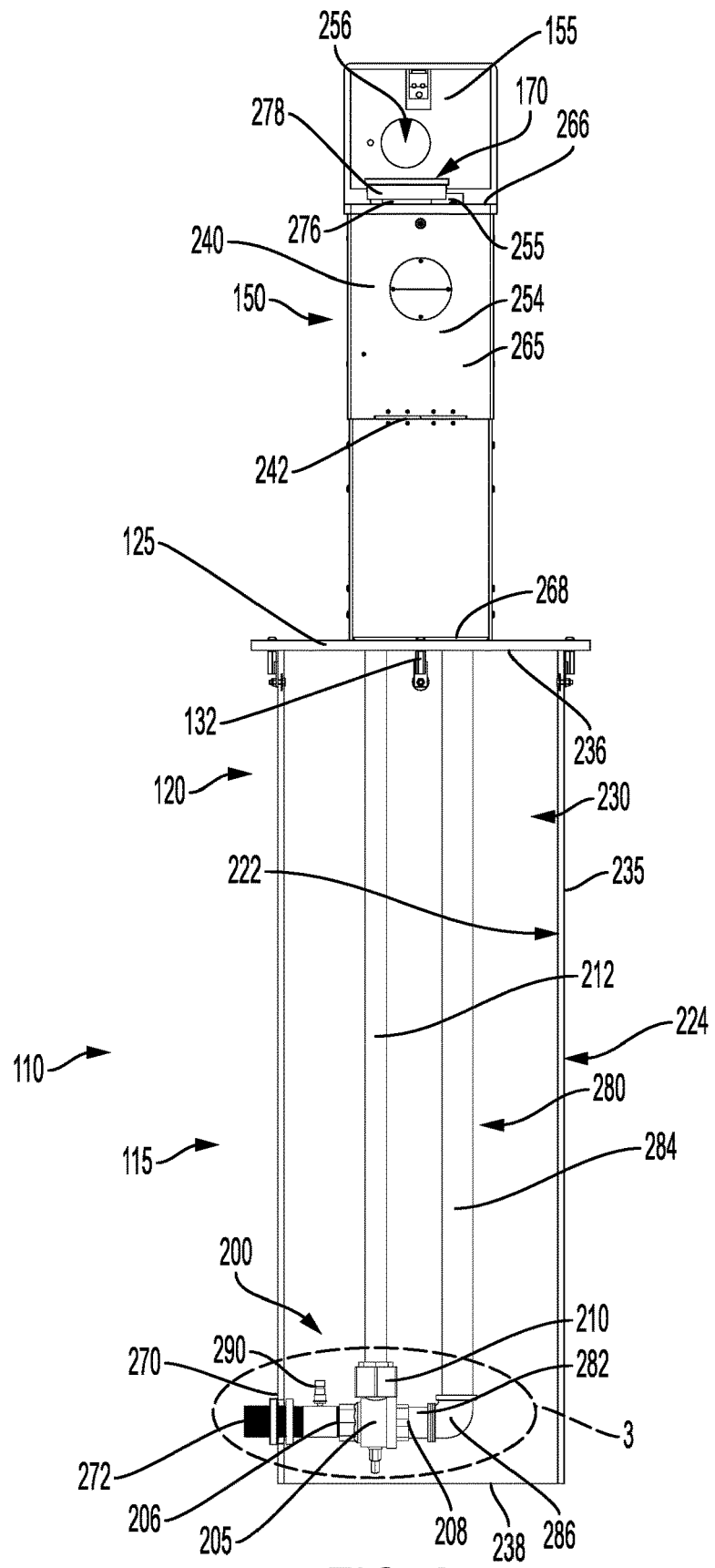
FIG. 2 is another front view of the fluid testing system of FIG. 1, wherein a pit housing of the pit assembly of FIG. 1 is illustrated as transparent.

As shown, according to various example aspects of the fluid testing system 100, in the present aspect, the sampling station assembly 140 can be attached to the pit assembly 110 at a top end 112 thereof. In one aspect, the sampling station assembly 140 can be a Mueller Co. Hydro-Guard® Sampling Station, for example, the Hydro-Guard® Blow-Off Sampling Station. In the present aspect, the sampling station assembly 140 can be an above-grade station; however, in other aspects, the sampling station assembly 140 can be a below-grade station. Example aspects of the sampling station assembly 140 can comprise a sampling station housing 145. The sampling station housing 145 can comprising a sampling station liner 150 and a sampling station lid 155. In various aspects, the sampling station lid 155 can be hingedly coupled to the sampling station liner 150 by a lid hinge 255 (shown in FIG. 2), such that the sampling station lid 155 is pivotable between a closed position, as shown in FIG. 1, and an open position, as shown in FIG. 2. In other aspects, the sampling station lid 155 may not be hingedly coupled to the sampling station liner 150. According to some example aspects, a pressure monitor 170 may be coupled with sampling station lid 155, as will be described in further detail below. In other aspects, the pressure monitor 170 may be positioned elsewhere on or within the fluid testing system 100, and other aspects may not comprise a pressure monitor 170.

As shown, the sampling station assembly 140 can be secured to the pit assembly 110. For example, the sampling station liner 150 can be secured to the pit lid 125, such that, in the present aspect, the sampling station assembly 140 can be stacked on the pit assembly 110, as shown. Thus, in the present aspect, the sampling station assembly 140 can be installed substantially above-grade. Other aspects of the sampling station assembly 140 may be installed fully or partially below-grade. The sampling station assembly 140 can be secured to the pit assembly 110 by a fastener, such as, for example, screws, nuts and bolts, adhesives, welding, or any other suitable fastener known in the art. In other aspects, the sampling station assembly 140 may be connected to the pit assembly 110 elsewhere on the pit assembly 110 or may not be connected to the pit assembly 110 at all.

The sampling station housing 145 can be configured to house and protect various components therein, as described in further detail below. As such, the sampling station liner 150 and sampling station lid 155 can be formed from a substantially rigid material, such that the components mounted therein can be sufficiently protected. For example, the sampling station liner 150 and sampling station lid 155 can be formed from a metal material, such as steel. In other aspects, the sampling station liner 150 and sampling station lid 155 can be formed from any other suitably rigid material, including, but not limited to, plastics and other types of metal, or any suitable combination thereof. In example aspects, the sampling station liner 150 and sampling station lid 155 can be formed from the same material, while in other aspects, the sampling station liner 150 and the sampling station lid 155 can be formed from varying materials.

FIG. 2 illustrates the pit liner 120 of the pit housing 115 as translucent for visibility of components mounted within the pit housing 115. FIG. 2 also illustrates the sampling station lid 155 pivoted to the open position. As shown in FIG. 2, example aspects of the pit assembly 110 can comprise the curb stop assembly 200, which can be in fluid communication with the fluid piping system as described in further detail below, and which can allow a user to selectively start and stop the flow of fluid through a curb stop valve 205 of the curb stop assembly 200. The curb stop valve 205 can be, for example, a ball valve, a butterfly valve, or any other suitable type of valve known in the art. According to example aspects, a portion of the curb stop assembly 200 can be received within the pit housing 115, along with the pressure transducer 290, for protection from undesirable external factors, such as dirt and moisture, heavy impacts, tampering, and the like.

As shown, example aspects of the pit liner 120 can define an inner pit liner surface 222 and an outer pit liner surface 224. The inner pit liner surface 222 can define an interior pit cavity 230 within which the curb stop assembly 200 and pressure transducer 290 can be mounted. Example aspects of the pit liner 120 can be formed from substantially rigid material, such as a metal material, such that the components mounted within the pit housing 115 can be protected, as described above. In example aspects, the pit liner 120 can comprise a substantially cylindrical pit sidewall 235. In other aspects, the pit sidewall 235 can define any other suitable shape. For example, the pit sidewall 235 can define a rectangular cross-sectional shape or any other suitable cross-sectional shape. Moreover, the pit sidewall 235 can define a first pit end 236 and a second pit end 238, each of which can be open and can allow access to the interior pit cavity 230.

The pit lid 125 can be provided for covering or substantially covering the open first pit end 236. As described above, the pit lid 125 can be coupled to the pit sidewall 235 by the screw and bracket assemblies 132 or any other suitable fastener 130. In some example aspects, the pit lid 125 can be lockable to prevent accidental or intentional tampering with the components within the interior pit cavity 230 (e.g., the pressure transducer 290 and curb stop assembly 200); however, in other aspects, the pit lid 125 may not be lockable. Furthermore, according to example aspects, the pit lid 125 can define a pit lid opening 425 (shown in FIG. 4) formed therethrough, which can provide access to the interior pit cavity 230 and which will be described in further detail below. Furthermore, in some aspects, the second pit end 238 opposite the pit lid 125 may not be completely open. For example, in some aspects, the pit liner 120 can comprise a pit end wall (not shown) oriented at the second pit end 238. The pit end wall can be semi-permeable, such that liquids can drain out of the pit liner 120 through the pit end wall, but solids such as dirt cannot enter the interior pit cavity 230 through the pit end wall. In other aspects, however, the pit end wall may provide a watertight seal with the pit sidewall 235, such that fluid cannot enter or exit the interior pit cavity 230 through the second pit end 238.

Example aspects of the sampling station liner 150 can define an inner station liner surface 652 (shown in FIG. 6) and an outer station liner surface 254. The inner station liner surface 652 can define an interior sampling station cavity 660 (shown in FIG. 6) within which various components can be housed and protected. In the present aspect, the sampling station liner 150 can comprise a sampling station sidewall 265 having the shape of a rectangular prism. In other aspects, the sampling station sidewall 265 can define any other suitable shape, including, but not limited to, cylindrical. The sampling station liner 150 can further comprise a sampling station door 240 hingedly coupled to the sampling station sidewall 265 by a door hinge 242. The sampling station door 240 can be opened to allow access to the interior sampling station cavity 660 or closed to prohibit access to the interior sampling station cavity 660. The sampling station sidewall 265 can define a first sampling station end 266 and a second sampling station end 268, and the sampling station lid 155 can be oriented at the first sampling station end 266, such that access to the interior sampling station cavity 660 at the first sampling station end 266 can be limited or prohibited when the sampling station lid 155 is closed. A sampling station opening (not shown) can be defined at the second sampling station end 268, such that the second sampling station end 268 is open and allows access to the interior sampling station cavity 660. In example aspects, the pit lid opening 425 can be substantially aligned with the sampling station opening to allow various components of the fluid testing system 100 to extend between the interior pit cavity 230 and the interior sampling station cavity 660.

According to example aspects, a pit access opening 270 can be provided through the pit sidewall 235 as shown. In other aspects, the pit access opening 270 can be provided through the pit end wall, if present. As shown, an inlet conduit 272 can extend through the pit access opening 270 to connect the fluid piping system to the components mounted within the interior pit cavity 230. For example, the inlet conduit 272 can allow the fluid piping system to be in fluid communication with the curb stop assembly 200. As shown, the curb stop assembly 200 can be installed below-grade (i.e., below ground level 180) within the pit housing 115 of the pit assembly 110.

Figure 3:
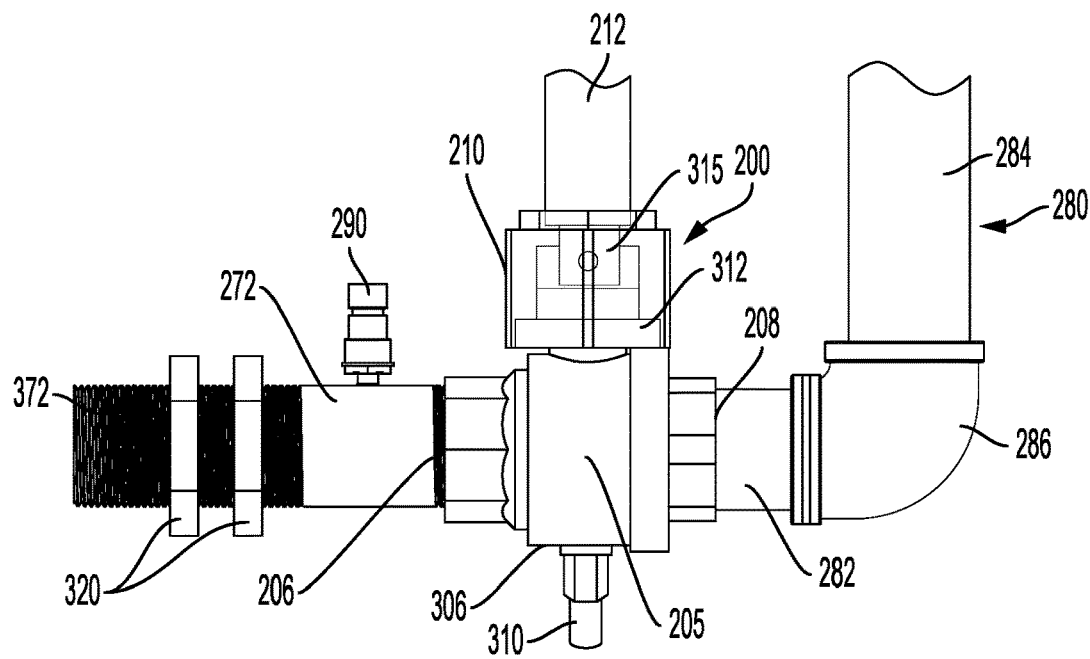
FIG. 3 is a detail front view of interior components of the pit assembly of FIG. 1 taken from Detail 3 in FIG. 2.

Example aspects of the curb stop assembly 200 can comprise a curb stop valve 205, a curb stop guide 210, a curb stop sleeve 212, and a curb stop rod 315 (shown in FIG. 3). The curb stop valve 205 can define a valve inlet end 206, a valve outlet end 208, and a fluid passageway (not shown) therebetween, and the valve inlet end 206 can be connected to the inlet conduit 272. The curb stop guide 210 can be generally positioned atop the curb stop valve 205, relative to the orientation shown, and can guide the curb stop rod 315 into engagement with the curb stop valve 205. In example aspects, the curb stop rod 315 can engage a valve cap 312 (shown in FIG. 3), which can be housed within the curb stop guide 210 and which can be movable relative to the curb stop valve 205 between a closed orientation, wherein the curb stop valve 205 is closed and fluid is prevented from flowing through the curb stop valve 205, and an open orientation, wherein the curb stop valve 205 is open and fluid is permitted to flow through the curb stop valve 205. The curb stop sleeve 212 can extend generally upward from the curb stop guide 210, relative to the orientation shown. The curb stop rod 315 can be housed within the curb stop sleeve 212 and can be connected to the valve cap 312 by a fastener, such as, for example, a clevis fastener, or any other suitable fastener known in the art. The curb stop rod 315 can be accessed through a sleeve opening 414 (shown in FIG. 4) at an upper section 413 (shown in FIG. 4) of the curb stop sleeve 212 distal from the curb stop guide 210. According to example aspects, the curb stop sleeve 212 can extend through the pit lid opening 425 and the sampling station opening, such that the upper section 413 of the curb stop sleeve 212 can extend into the interior sampling station cavity 660.

According to example aspects, the curb stop assembly 200 can be operated to open and close the curb stop valve 205 to selectively allow or prohibit fluid flow therethrough from the valve inlet end 206 to the valve outlet end 208. In one aspect, a user can engage a tool (not shown), such as a key, with the curb stop rod 315 at a rod key end 416 (shown in FIG. 4) thereof. The key or other tool can be manually rotated to rotate the curb stop rod 315 within the curb stop sleeve 212, which can in turn rotate (or otherwise move) the valve cap 312 to which the curb stop rod 315 is connected. The valve cap 312 can be rotated to the closed orientation to close the curb stop valve 205 or to the open orientation to open the curb stop valve 205, depending upon the direction in which the key is turned.

Example aspects of the fluid testing system 100 can further comprise a sampling pipe 280 connected to the curb stop valve 205 at the valve outlet end 208, opposite the inlet conduit 272, as shown. In the present aspect, the sampling pipe 280 can generally define an L-shape, having a substantially horizontal pipe segment 282 extending from the valve outlet end 208 and a substantially vertical pipe segment 284 extending generally upward from the horizontal pipe segment 282. The horizontal and vertical pipe segments 282, 284 can be linked together by a bend pipe fitting 286. According to example aspects, fluid from the fluid piping system can pass through the curb stop valve 205 when the valve 205 is open and can travel up the sampling pipe 280, relative to the orientation shown. An upper section 484 (shown in FIG. 4) of the vertical pipe segment 284 of the sampling pipe 280 can extend into the interior sampling station cavity 660, and fluid samples can be collected from the sampling pipe 280 within the sampling station assembly 140, as will be described in further detail below.

In some aspects of the sampling station assembly 140, the sampling station lid 155 can define a sampling station lid hole 256 therethrough and the pressure monitor 170 can be coupled thereto. In the present aspect, the pressure monitor 170 can define a lower portion 276 configured to be received through the sampling station lid hole 256 and to extend into the interior sampling station cavity 660 and an upper portion 278 positioned outside of the interior sampling station cavity 660. In other aspects, the upper portion 278 of the pressure monitor 170 can be positioned inside the interior sampling station cavity 660. The upper portion 278 of the pressure monitor 170 can comprise an antenna (not shown) housed within that can be configured to send signals to a third party or device (e.g., an external operations center of a utility company) related to the measured pressure of the fluid in the fluid piping system. In some aspects, the sampling station housing 145 can be formed from a ferrous material, such as, for example and without limitation, stainless steel. The upper portion 278 of the pressure monitor 170 comprising the antenna can be oriented outside of the sampling station housing 145 such that the ferrous material will not interfere with signals sent by the antenna. In other aspects, the sampling station housing 145 can be formed from non-ferrous materials, or a combination of ferrous and non-ferrous materials. Furthermore, other aspects of the fluid testing system 100 may not comprise the pressure monitor 170.

FIG. 3 illustrates a detail view of the inlet conduit 272, pressure transducer 290, and the curb stop valve 205. According to example aspects, the pressure transducer 290 can be positioned on the inlet conduit 272 between the fluid piping system and the curb stop valve 205, as shown. In other aspects, the pressure transducer 290 can be positioned elsewhere within the fluid testing system 100. In some aspects, a bulkhead fitting (not shown) can be installed on the inlet conduit 272 and the pressure transducer 290 can be connected to the bulkhead fitting. The pressure transducer 290 can be any suitable type of pressure transducer 290, such as a strain gauge pressure transducer or any other pressure transducer known in the art. According to example aspects, the pressure transducer 290 can be configured to measure the pressure of the fluid in the inlet conduit 272 from the fluid piping system. In some aspects, fluid from the fluid piping system can be received in the inlet conduit 272 even when the curb stop valve 205 is closed, and as such, the pressure transducer 290 can be configured to measure the pressure of the fluid when the curb stop valve 205 is both opened and closed. Some aspect of the pressure transducer 290 can further be configured to generate an electrical signal representative of the measured pressure. The pressure transducer 290 can be communicatively coupled to the pressure monitor 170, such that the electrical signal can be relayed to the pressure monitor 170 (shown in FIG. 1). For example, the pressure transducer 290 can be communicatively coupled to the pressure monitor 170 by a wire, and the data can be transmitted from the pressure transducer 290 to the pressure monitor 170 through the wire. In other aspects, the pressure transducer 290 can be wirelessly coupled to the pressure monitor 170 for the transmission of data (e.g., via Bluetooth®.) As described above, the antenna of the pressure monitor 170 can then send signals to a third party related to the pressure data. For example, the fluid testing system 100 may send alerts to a third party when notable spikes or drops in pressure are detected. According to example aspects, the pressure transducer 290 can be within the pit housing 115 for protection from undesirable external factors, such as dirt, moisture, heavy impacts, tampering, and the like.

As shown, the curb stop guide 210 is illustrated as transparent for visibility of the components therein. As described above, the curb stop guide 210 can guide the curb stop rod 315 into engagement with the valve cap 312. According to example aspects, a drain 310 can be provided on a bottom side 306 of the curb stop valve 205, as shown. The drain 310 can be in fluid communication with the fluid passageway of the curb stop valve 205. Example aspects of the drain 310 can allow excess fluid received within the sampling pipe 280 and curb stop valve 205 to drain out of the fluid testing system 100 at the second pit end 238 of the pit assembly 110. Draining the excess fluid out of the fluid testing system 100 can aid in preventing damage to the curb stop assembly 200 and/or sampling pipe 280 that can be caused by the excess fluid freezing within these components during low temperatures. The excess fluid can be drained out through the drain 310 after fluid samples are taken through the sampling pipe 280 or after the fluid piping system is flushed, the processes for which is described in further detail below.

In some aspects, the fluid testing system 100 can comprise a pair of retaining nuts 320 configured to aid in securing the inlet conduit 272 to the pit sidewall 235 (shown in FIG. 2) at the pit access opening 270 (shown in FIG. 2). As shown, the inlet conduit 272 can define a threaded portion 372 which can be configured to threadably engage a corresponding threaded opening (not shown) formed in each of the retaining nuts 320. In example aspects, a first one of the retaining nuts 320 can be configured to abut the inner pit liner surface 222 (shown in FIG. 2) of the pit liner 120 (shown in FIG. 2) and a second one of the retaining nuts 320 can be configured to abut the outer pit liner surface 224 (shown in FIG. 2) of the pit liner 120. The retaining nuts 320 can be sufficiently tightened against the inner and outer pit liner surfaces 222,224 to secure the inlet conduit 272 in position relative to the pit liner 120.

Figure 4:
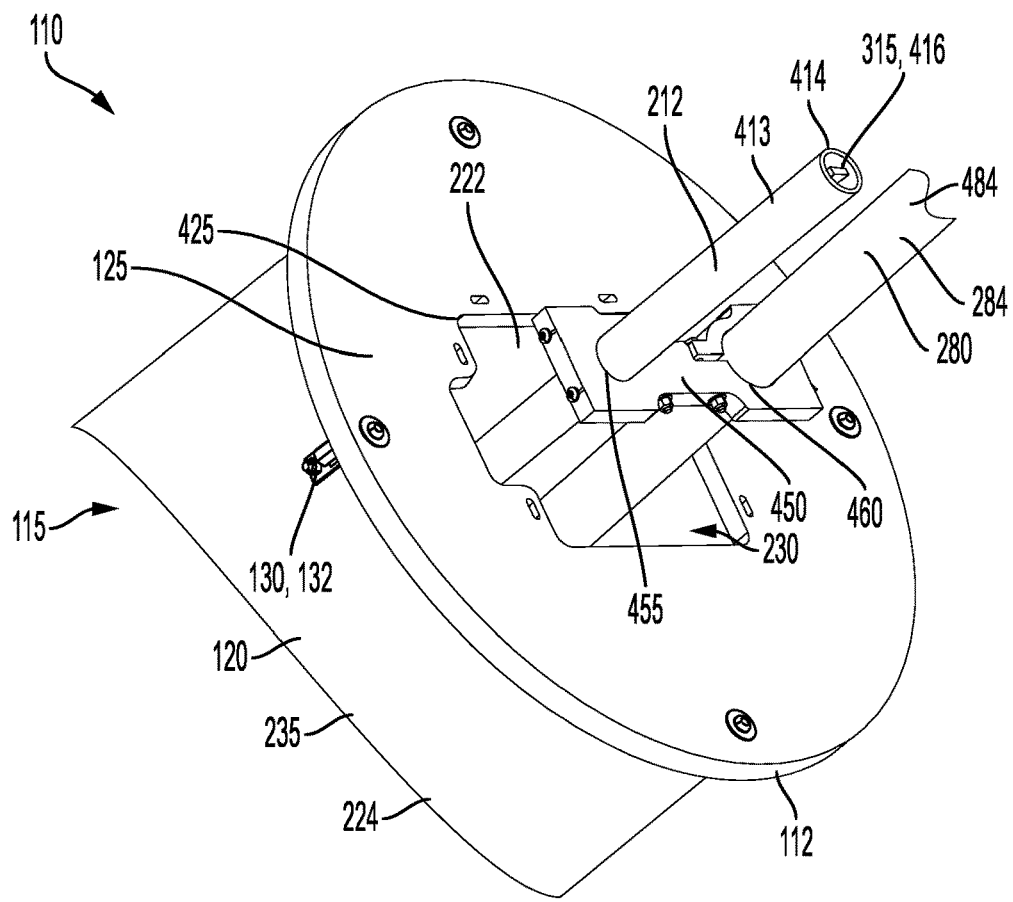
FIG. 4 is a top perspective view of a top end of the pit assembly of FIG. 1.

FIG. 4 is a top perspective view of the pit assembly 110, illustrating the pit lid 125 of the pit housing 115. As shown, the pit lid 125 can define the pit lid opening 425 formed therethrough, which can allow access to the interior pit cavity 230. In the present aspect, the upper section 413 of the curb stop sleeve 212 and an upper section 484 of vertical pipe segment 284 of the sampling pipe 280 can extend through the pit lid opening 425 and into the interior sampling station cavity 660 (shown in FIG. 6) of the sampling station assembly 140 (shown in FIG. 1). In various aspects, one or more retaining bracket 450 can be provided for retaining the vertical pipe segment 284 of the sampling pipe 280 and the curb stop sleeve 212 in position in an upright orientation. For example, the vertical pipe segment 284 can pass through a pipe retaining hole 460 formed in the retaining bracket 450, and the curb stop sleeve 212 can pass through a sleeve retaining hole 455 formed in the retaining bracket 450, as shown. The retaining bracket(s) 450 can be positioned within the interior sampling station cavity 660 when the sampling station assembly 140 is mounting to the pit assembly 110. Other aspects can comprise more retaining brackets 450, and still other aspects may not comprise retaining brackets 450. Furthermore, in some aspects, the retaining bracket(s) 450 can be positioned alternatively or additionally within the interior pit cavity 230.

In the present FIG. 4, the curb stop rod 315 can be seen housed within the curb stop sleeve 212. As shown, the curb stop sleeve 212 can define the sleeve opening 414 through which the curb stop rod 315 can be accessed. The curb stop rod 315 can define the rod key end 416 positioned proximate the sleeve opening 414. In example aspects, as described above, a user can manually engage the rod key end 416 of the curb stop rod 315 with a tool, such as a key, to actuate the curb stop rod 315. For example, the key may be used to rotate the curb stop rod 315. Rotating the curb stop rod 315 can rotate the valve cap 312 to selectively open or close the curb stop valve 205. When the curb stop valve 205 is opened, fluid can flow through the curb stop valve 205 from the fluid piping system to the sampling pipe 280. Samples of the fluid can be taken from the sampling pipe 280 or the fluid can be flushed through a blow-off assembly 590 (shown in FIG. 5), as described in further detail below.

Figure 5:
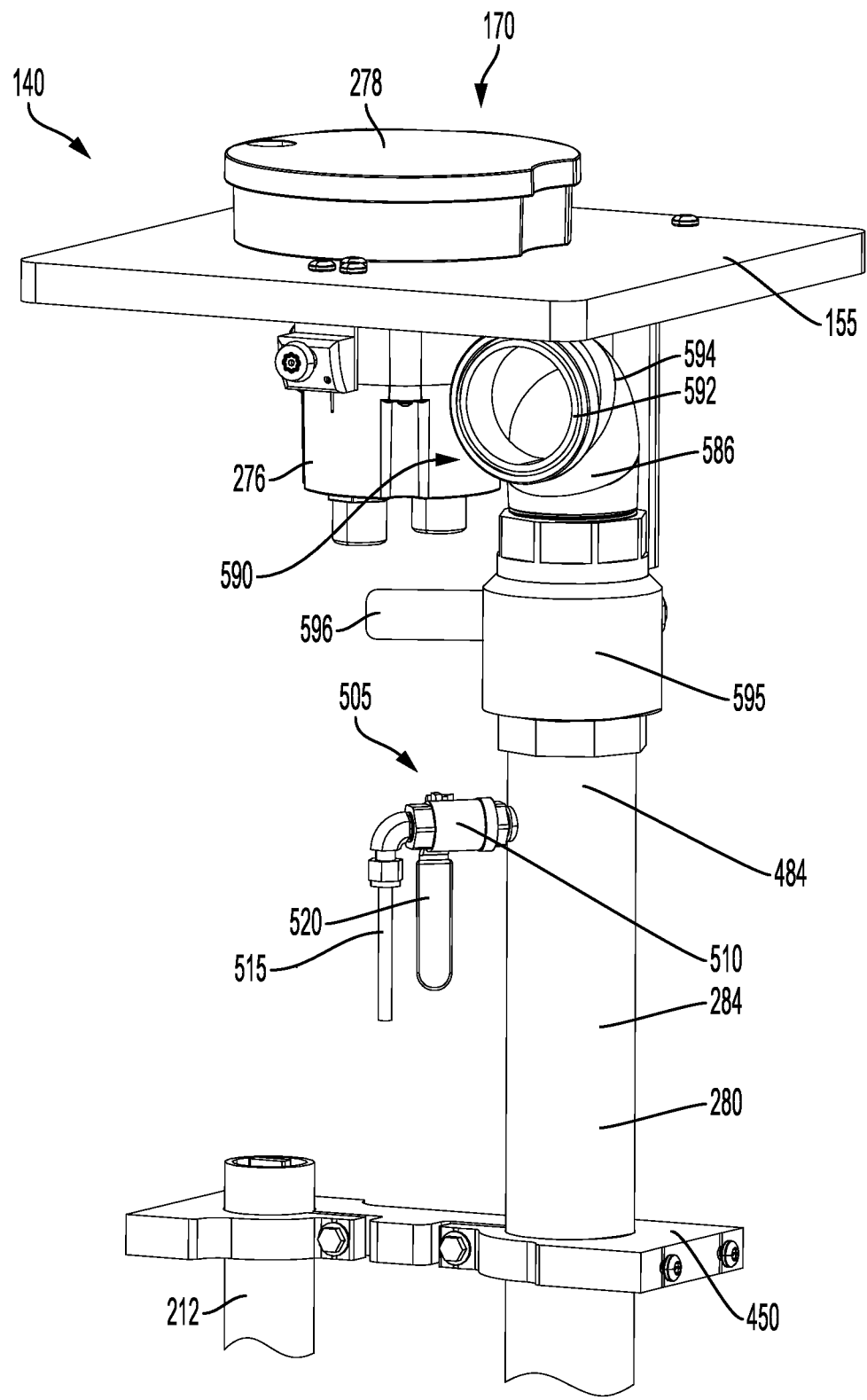
FIG. 5 is a top perspective view of interior components of the sampling station assembly of FIG. 1.
Figure 6:
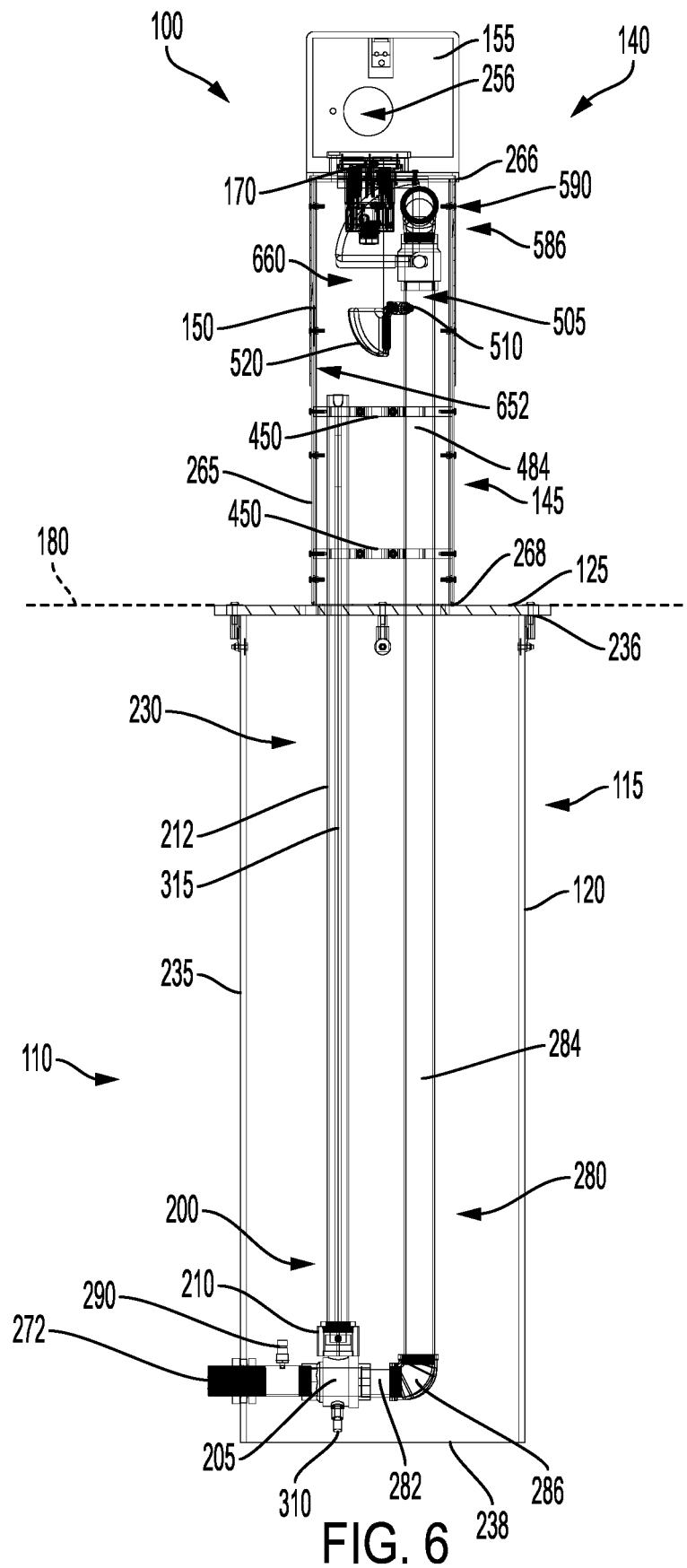
FIG. 6 is a front view of the fluid testing system, wherein the pit housing of FIG. 2 and a sampling station housing of the sampling station assembly of FIG. 1 are illustrated as transparent.

FIG. 5 illustrates the sampling station assembly 140 with the sampling station liner 150 (shown in FIG. 1) removed for visibility of the components received/mounted within the interior sampling station cavity 660 (shown in FIG. 6). As illustrated, the upper portion 278 of the pressure monitor 170 can extend above the sampling station lid 155, relative to the orientation shown, such that it is positioned outside of the interior sampling station cavity 660, while the lower portion 276 of the pressure monitor 170 can extend through the sampling station lid 155 and into the interior sampling station cavity 660. As shown, another retaining bracket 450 can be positioned proximate to the sleeve opening 414 of the curb stop sleeve 212 and can aid in further retaining the curb stop sleeve 212 and the vertical pipe segment 284 of the sampling pipe 280 in the upright orientation.

According to example aspects, a sampling assembly 505 can be oriented on the upper section 484 of the vertical pipe segment 284, as shown. The sampling assembly 505 can be configured to dispense samples of fluid from the sampling pipe 280 for testing the quality of the fluid. For example, as described above, the fluid can be tested for levels of lead, bacteria, nitrates, chlorine, pH levels, or the like. A sampling valve 510 can be connected to the sampling pipe 280 for transmitting fluid from the sampling pipe 280 to a sampling dispenser 515 through which the fluid can be dispensed. The fluid can be dispensed into a collection container and can be tested on site or taken to a testing facility. Example aspects of the sampling assembly 505 can further comprise a sampling actuator 520 configured to open and close the sampling valve 510 to selectively allow or prevent fluid flow through the sampling dispenser 515, respectively. In the current aspect, the sampling actuator 520 is a handle on the sampling valve. As such, to obtain a fluid sample of the fluid in the fluid piping system, the valve cap 312 can be moved to the open orientation to open the curb stop valve 205 and allow fluid to flow from the fluid piping system into the inlet conduit 272 and through the open curb stop valve 205. The fluid can flow from the valve inlet end 206 to the valve outlet end 208 of the curb stop valve 205 and into the sampling pipe 280. The sampling actuator 520 can be actuated to open the sampling valve 510, to allow fluid to flow from the sampling pipe 280 through the sampling valve 510 and into the sampling dispenser 515. The sampling dispenser 515 can then dispense the fluid into a collection container for testing.

According to example aspects, the sampling pipe 280 can further comprise the blow-off assembly 590 configured to flush out contaminated fluid from the fluid piping system. As shown, the blow-off assembly 590 can be oriented at an upper pipe end 586 of the vertical pipe segment 284 of the sampling pipe 280. The blow-off assembly 590 can define a curved section 594 formed in the vertical pipe segment 284 and a blow-off opening 592 through which fluid can be expelled. The fluid piping system can be flushed to expel fluid tainted with undesirable contaminants, like bacteria, or having undesirable levels of various substances, including, but not limited to lead, nitrates, chlorine, etc. The fluid can be can be flushed for any other suitable purpose, as well. In various aspects, the sampling station door 240 of the sample station liner 150 can be pivoted open about its corresponding door hinge 242 so that the fluid can be expelled out of the sampling station assembly 140 and into the external surroundings. According to example aspects, a blow-off valve 595 can be provided within the vertical pipe segment 284 which can be selectively opened and closed to allow and prevent, respectively, fluid flow out of the blow-off opening 592. As shown, the blow-off valve 595 can comprise a blow-off actuator 596, which can be operated to open and close the blow-off valve 595. In various aspects, sampling valve 510 and the blow-off valve 595 can each be, for example, a ball valve, a butterfly valve, or any other suitable type of valve known in the art.

FIG. 6 illustrates the fluid testing system 100 with the pit housing 115 and the sampling station housing 145 illustrated as transparent for full visibility of the interior components. The curb stop sleeve 212 is also illustrated as transparent for visibility of the curb stop rod 315 housed therein. As shown, the pit assembly 110 can be installed substantially below-grade (i.e., below ground level 180), and the pit lid 125 can be about flush with ground level 180. The pressure transducer 290 and the curb stop valve 205 can be mounted within the interior pit cavity 230 of the pit housing 115 for protection from undesirable external factors, including, but not limited to, dirt, moisture, impacts, tampering, and the like. Furthermore, the sampling station assembly 140 can be installed substantially above-grade (i.e., above ground level 180). The blow-off assembly 590, sampling assembly 505, and the lower portion 276 of the pressure monitor 170 can be mounted within the interior sampling station cavity 660 of the sampling station assembly 140 for protection from undesirable external factors, including, but not limited to, dirt, moisture, impacts, tampering, and the like. According to example aspects, the curb stop sleeve 212 and the curb stop rod 315 housing therein can extend between the interior pit cavity 230 and the interior sampling station cavity 660, and the vertical pipe segment 284 of the sampling pipe 280 can extend between the interior pit cavity 230 and the interior sampling station cavity 660.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pit assembly comprising:
a pit housing defining a pit lid opening;
a curb stop assembly mounted within the pit housing and comprising:
a curb stop valve defining a valve inlet, a valve outlet, and a fluid passageway therebetween, the curb stop valve further comprising a valve cap and a drain arranged between the valve inlet and the valve outlet and in fluid communication with the fluid passageway to allow excess fluid to drain out of the drain in the curb stop valve when the curb stop valve is in a closed valve configuration;
a curb stop sleeve coupled to and extending outward from the curb stop valve, the curb stop sleeve comprising a curb stop guide positioned atop the valve cap; and
a curb stop rod received in the curb stop guide configured to guide the curb stop rod into engagement with the valve cap to actuate the curb stop valve between the closed valve configuration and an open valve configuration;

wherein, in the closed valve configuration, fluid is prevented from flowing through the fluid passageway, and in the open valve configuration, wherein fluid is permitted to flow through the fluid passageway; and wherein the curb stop rod and the curb stop sleeve extend through the pit lid opening in the pit housing.

2. The pit assembly of claim 1, wherein the pit housing comprises a pit liner and a pit lid, and wherein the pit lid opening is defined through the pit lid.

3. The pit assembly of claim 1, further comprising an inlet conduit coupled to the curb stop assembly and configured to transport fluid to the curb stop assembly, and wherein the pit housing defines a pit access opening and the inlet conduit extends through the pit access opening.

4. The pit assembly of claim 1, further comprising a valve cap coupled to the curb stop valve, wherein a proximal end of the curb stop rod engages the valve cap, and wherein the valve cap is moveable between a closed orientation to configure the curb stop valve in the closed valve configuration and an open orientation to configure the curb stop valve in the open valve configuration.

5. The pit assembly of claim 4, further comprising a curb stop guide coupled to the curb stop valve and configured to guide the proximal end of the curb stop rod into engagement with the valve cap.

6. The pit assembly of claim 5, wherein the valve cap is housed within the curb stop guide.

7. The pit assembly of claim 4, wherein the curb stop is coupled to the valve cap by a fastener.

8. The pit assembly of claim 7, wherein the valve cap is rotatable relative to the curb stop valve between the closed orientation and the open orientation.

9. The pit assembly of claim 8, wherein the curb stop sleeve defines a sleeve opening distal to the valve cap, and wherein a rod key end of the curb stop rod is accessible through the sleeve opening.

10. The pit assembly of claim 9, wherein the curb stop rod is rotatable within the curb stop sleeve, and wherein rotating the curb stop rod within the curb stop sleeve rotates the valve cap between the closed orientation and the open orientation.

11. The pit assembly of claim 1, comprising a retaining bracket configured to retain a vertical pipe segment of the curb stop sleeve in an upright orientation.

12. The pit assembly of claim 11, wherein the vertical pipe segment passes through a pipe retaining hole formed in the retaining bracket.

13. The pit assembly of claim 1, further comprising a pressure transducer housed within the pit housing and communicatively coupled to a pressure monitor, the pressure transducer configured to generate an electrical signal representative of the pressure obtained from the pressure monitor.

* * * * *